United States Patent
Hori et al.

(10) Patent No.: US 8,511,899 B2
(45) Date of Patent: Aug. 20, 2013

(54) FLUID DYNAMIC BEARING DEVICE, AND MANUFACTURING METHOD OF BEARING MEMBER

(75) Inventors: Masaharu Hori, Kuwana (JP); Yoshiharu Inazuka, Ama-gun (JP)

(73) Assignee: NTN Corporation, Osaka-shi (JP)

( * ) Notice: Subject to any disclaimer, the term of this patent is extended or adjusted under 35 U.S.C. 154(b) by 484 days.

(21) Appl. No.: 12/446,000

(22) PCT Filed: Nov. 2, 2007

(86) PCT No.: PCT/JP2007/071421
§ 371 (c)(1),
(2), (4) Date: Apr. 17, 2009

(87) PCT Pub. No.: WO2008/065855
PCT Pub. Date: Jun. 5, 2008

(65) Prior Publication Data
US 2011/0019948 A1    Jan. 27, 2011

(30) Foreign Application Priority Data
Nov. 27, 2006 (JP) .................................. 2006-318871

(51) Int. Cl.
*F16C 32/06* (2006.01)
(52) U.S. Cl.
USPC .......................................... 384/120; 384/107
(58) Field of Classification Search
USPC ........... 384/100, 107, 114, 115, 120; 310/90; 360/99.07, 99.08; 29/898.02
See application file for complete search history.

(56) References Cited

U.S. PATENT DOCUMENTS

| | | | | |
|---|---|---|---|---|
| 5,941,644 A | * | 8/1999 | Takahashi | 384/112 |
| 7,492,548 B2 | * | 2/2009 | Asada et al. | 360/99.08 |
| 7,654,796 B2 | * | 2/2010 | Yeh et al. | 310/90 |
| 2003/0133633 A1 | * | 7/2003 | Nakamura | 384/107 |
| 2005/0238267 A1 | | 10/2005 | Nakamura | |
| 2008/0203838 A1 | | 8/2008 | Komori et al. | |
| 2008/0304776 A1 | * | 12/2008 | Asada et al. | 384/112 |
| 2009/0129710 A1 | * | 5/2009 | Ito et al. | 384/107 |

FOREIGN PATENT DOCUMENTS

| | | |
|---|---|---|
| JP | 2005-308186 A | 11/2005 |
| JP | 2006-53975 A | 2/2006 |
| JP | 2006-226520 A | 8/2006 |
| JP | 2007-255450 A | 10/2007 |
| WO | 2006/115104 A1 | 11/2006 |

OTHER PUBLICATIONS

Translation of JP2007-255450 obtained on Feb. 6, 2013.*

(Continued)

*Primary Examiner* — James Pilkington
(74) *Attorney, Agent, or Firm* — Westerman, Hattori, Daniels & Adrian, LLP

(57) ABSTRACT

A molding pin (23) is formed in a sectional shape of being held in contact at two points (contact points are denoted by P') with an imaginary cylindrical surface (C'). As a result, an undercut of a fixation hole (21$b$1) is reduced or eliminated, and hence it becomes easier to process a die. Moreover, a corner portion (21$d$) between a cylindrical surface (21$c$) and the fixation hole (21$b$1) becomes obtuse, and hence the die becomes less liable to deform and break. Therefore, manufacturing cost of the die can be reduced, and hence cost reduction of the bearing device can be achieved.

2 Claims, 7 Drawing Sheets

(56) References Cited

OTHER PUBLICATIONS

Notification of Transmittal of Translation of the International Preliminary Report on Patentability (Form PCT/IB/338) of International Application No. PCT/JP2007/071421 mailed Jun. 11, 2009 with Forms PCT/IB/373 and PCT/ISA/237.

International Search Report of PCT/JP2007/071421, date of mailing Jan. 29, 2008.

* cited by examiner

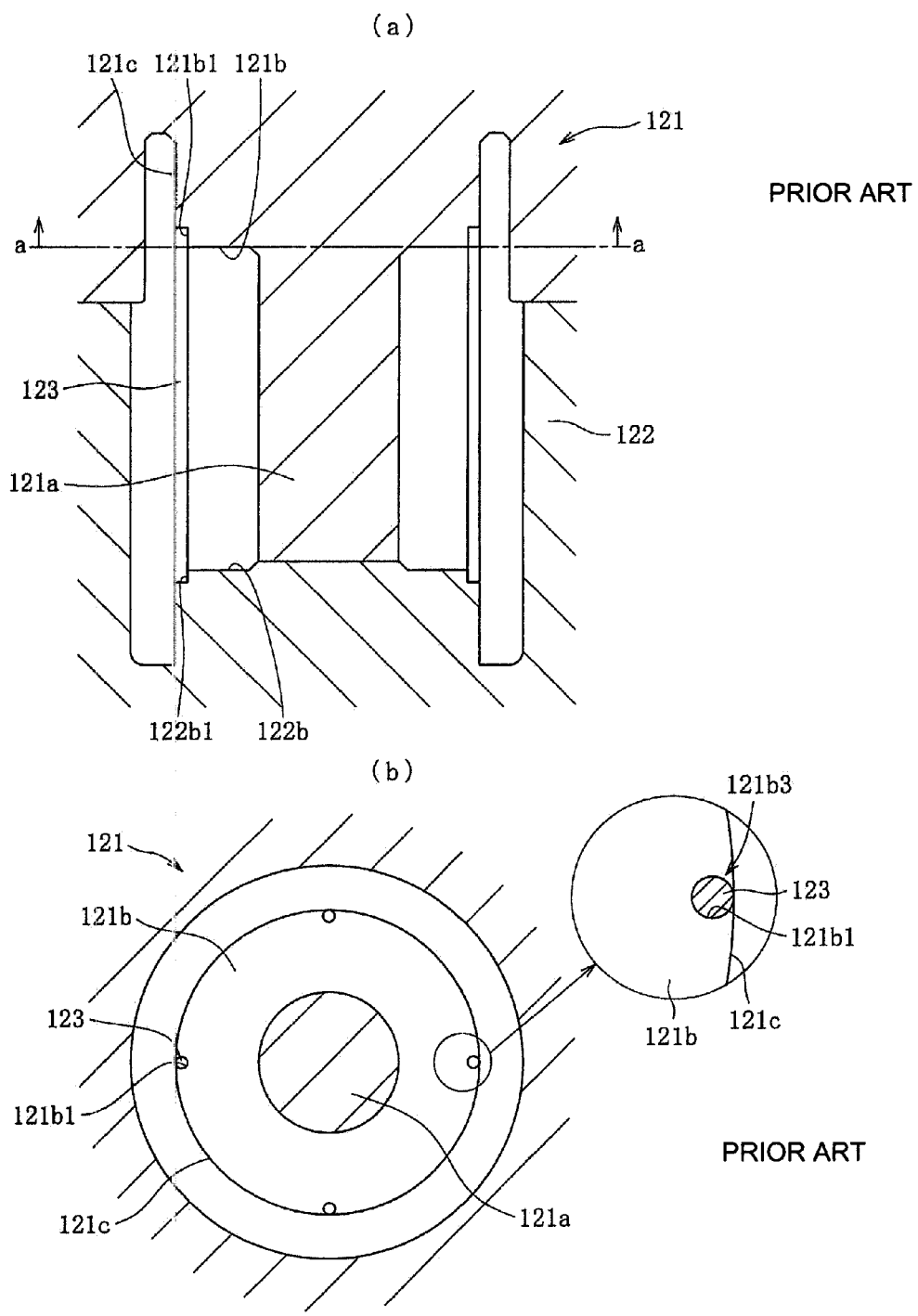
PRIOR ART

FLUID DYNAMIC BEARING DEVICE, AND MANUFACTURING METHOD OF BEARING MEMBER

TECHNICAL FIELD

The present invention relates to a fluid dynamic bearing device for rotatably supporting a shaft member by means of a dynamic pressure effect of a lubricating fluid generated in a bearing gap, and a manufacturing method of a bearing member used for the fluid dynamic bearing device.

BACKGROUND ART

A fluid dynamic bearing device of this type can be suitably used in a small motor such as a spindle motor for an information apparatus such as a magnetic disk drive like an HDD, an optical disk drive for a CD-ROM, CD-R/RW, DVD-ROM/RAM or the like, or a magneto-optical disk drive for an MD, MO or the like, as a polygon scanner motor of a laser beam printer (LBP), as a motor for a projector color wheel, or as a fan motor used in an electrical apparatus or the like.

In many of conventional fluid dynamic bearing devices, a bearing sleeve is fixed to an inner periphery of a housing, and a shaft member is inserted into an inner periphery of the bearing sleeve so that a radial bearing gap is formed between an outer peripheral surface of the shaft member and an inner peripheral surface of the bearing sleeve. By means of a dynamic pressure effect of a lubricatine fluid, which is generated in the radial bearing gap, the shaft member is rotatably supported.

In recent years, for the purpose of cost reduction and the like involved with reduction in the number of components, it has been proposed that the bearing sleeve and the housing are integrated with each other and replaced with a die-molded product (Patent. Document 1).

Patent Document 1: JP 2006-226520 A

DISCLOSURE OF THE INVENTION

Problem to be Solved by the Invention

Incidentally, in the fluid dynamic bearing device, in order to maintain the pressure balance of a lubricating oil filling the inside of the bearing device, there is provided a circulation path for circulating the lubricating oil on the inside of the bearing device in many cases. As described above, in the structure in which the bearing sleeve and the housing are integrated with each other (hereinafter, the integrated component is referred to as "bearing member"), it is necessary to form a through-hole as a part of the circulation path in the bearing member. In terms of cost and prevention of contamination, it is desirable that the through-hole be formed by molding simultaneously with die molding of the bearing member.

FIG. 9 illustrates an example of a bearing member 107 provided with a through-hole. The bearing member 107 has a complete contour of an assembly in which the bearing sleeve is fixed to the inner peripheral surface of the housing. The inner peripheral surface is constituted by a smaller diameter inner peripheral surface 107a corresponding to the inner peripheral surface of the bearing sleeve, and a first larger diameter inner peripheral surface 107b and a second larger diameter inner peripheral surface 107c which correspond to the inner peripheral surface of the housing. Between one end of the smaller diameter inner peripheral surface 107a and one end of the first larger diameter inner peripheral surface 107b, there is formed a first shoulder surface 107d in a radial direction. Between the other end of the smaller diameter inner peripheral surface 107a and one end of the second larger diameter inner peripheral surface 107c, there is formed a second shoulder surface 107e in the radial direction. Axial through-holes 112 are open in the first shoulder surface 107d and the second shoulder surface 107e.

The bearing member 107 can be formed by injection molding with use of, for example, a die illustrated in FIG. 10. The die includes a movable die 121, a fixed die 122, and molding pins 123 for molding the through-holes 112. The movable die 121 includes a shaft portion 121a for molding the smaller diameter inner peripheral surface 107a of the bearing member 7, a shoulder surface 121b for molding the first shoulder surface 107d, and a cylindrical surface 121c for molding the first larger diameter inner peripheral surface 107b. The fixed die 122 includes a shoulder surface 122b for molding the second shoulder surface 107e. In the radially outer portion of the shoulder surface 121b of the movable die 121, there are formed fixation holes 121b1. One ends of the molding pins 123 are inserted into the fixation holes 121b1. In this state, the movable die 121 and the fixed die 122 are clamped to each other, and the other ends of the molding pins 123 are inserted into fixation holes 122b1 formed in the radially outer portion of the shoulder surface 122b of the fixed die 122. As a result, the molding pins 123 are positioned in the cavities.

In this case, as illustrated in an enlarged sectional view of FIG. 10(b), when the molding pins 123 have circular sectional shapes, and the outer peripheral surfaces of the molding pins 123 are each internally held in contact at one point with the cylindrical surface 121c for molding the first larger diameter inner peripheral surface 107b, the fixation holes 121b1 have extremely large undercuts, and hence it becomes more difficult to process the die. Further, even when the die can be processed, corner portions 121b3 between the cylindrical surface 121c and the fixation holes 121b1 exhibit tapered shapes, and hence the die becomes more liable to deformation and breakage. Those lead to significant increase in manufacturing cost of the die, and additionally to increase in cost of the bearing device.

Under the circumstances, the present invention has been made, and a main object thereof is to achieve cost reduction of the bearing device by enabling the through-hole of the bearing device to be formed by die molding at low cost.

Means for Solving the Problem

In order to achieve the above-mentioned object, according to the present invention, a bearing member including the following is formed by injection molding: a larger diameter inner peripheral surface; a smaller diameter inner peripheral surface forming, together with a shaft member, a radial bearing gap therebetween; a shoulder surface between the larger diameter inner peripheral surface and the smaller diameter inner peripheral surface; and an axial through-hole in which a lubricating fluid communicates, and a molding pin for molding the through-hole is arranged in a cavity and an outer peripheral surface on at least one end side of the molding pin is formed in a sectional shape of being held in contact at two points with an imaginary cylindrical surface C' including a molding surface of the larger diameter inner peripheral surface.

In a molding die of a bearing device illustrated in FIG. 4(b), an imaginary cylindrical surface including a molding surface (cylindrical surface 121c) of the larger diameter inner peripheral surface is denoted by reference symbol C'. As illustrated in the figure, when the molding pins 23 have sectional shapes of being held in contact at two points (contact points are denoted by P') with the imaginary cylindrical surface C', the undercuts of fixation holes 21b1 are reduced or eliminated, and hence it becomes easier to process the die. Further, corner portions 21d between a cylindrical surface 21c and the fixation holes 21b1 become obtuse, and hence the die becomes less liable to deform and break. Therefore, manufacturing cost of the die can be reduced, and hence cost reduction of the bearing device can be achieved.

A first larger diameter inner peripheral surface 7b of a bearing member 7 has the same shape and the same dimensions as those of the cylindrical surface 21c for molding the same. Similarly, through-holes 12 of the bearing member have the same shape and the same dimensions as those of the molding pins 23 for molding the same. Accordingly, the present invention is characterized also by including:

a bearing member having:
a larger diameter inner peripheral surface;
a smaller diameter inner peripheral surface; and
a shoulder surface between the larger diameter inner peripheral surface and the smaller diameter inner peripheral surface; and
an axial through-hole in which the lubricating fluid communicates, the bearing member being formed by die molding together with the through-hole; and
a shaft member inserted into the inner periphery of the bearing member, the shaft member being supported in the radial direction by means of a dynamic pressure effect of the lubricating fluid, which is generated in the radial bearing gaps between the smaller diameter inner peripheral surface of the bearing member and the outer peripheral surface of the shaft member, wherein a sectional shape of an inner peripheral surfaces on at least one end side of the through-hole is brought into contact at two points with the imaginary cylindrical surface C including the larger diameter inner peripheral surface.

In particular, as illustrated in FIG. 3(b), when sides of the inner peripheral surfaces of the through-holes, which extend from the contact points P between the imaginary cylindrical surface C and the inner peripheral surfaces of the through-holes toward a central side of the bearing member, are parallel to center lines O of the through-holes, it is possible to eliminate the undercuts of the fixation holes 21b1 of the molding pins 23 used at the time of injection molding. Accordingly, manufacturing cost of the die can be further reduced. Note that, the center lines O herein represent straight lines connecting a center $O_1$ of the bearing member and centers (centroids) $O_2$ of the through-holes in a radial cross-section (refer to FIG. 3(b)), and the same applies to the following description.

In a case where the sectional shape of the inner peripheral surface of each of the through-holes has a curved portion such as semicircle, when tangent lines at the contact points P on the inner peripheral surfaces of the through-holes, which extend from the contact points P between the imaginary cylindrical surface C and the through-holes toward the central side of the bearing member, are parallel to the center lines O of the through-holes, the same effect as described above can be obtained.

Further, the same effect as described above can be similarly obtained even when the one sides of the inner peripheral surfaces of the through-hole (refer to FIG. 5) or the tangent lines at the contact points P on the inner peripheral surfaces of the through-hole (refer to FIG. 6) has shapes of gradually approaching to the center lines O of the through-hole toward the central side of the bearing member as illustrated in FIGS. 5 and 6, the one sides extending from the contact points P between the imaginary cylindrical surface C and the through-hole toward the central side of the bearing member, the tangent lines extending from the contact points P between the imaginary cylindrical surface C and the through-hole toward the central side of the bearing member.

When the through-hole have radial sectional areas different from each other in the axial direction, the molding pin for molding the through-hole can be made partially thicker. With this configuration, rigidity of the molding pin can be increased, and hence it is possible to reduce failures such as bending or fold-breakage of the molding pin and to further enhance the moldability.

Effects of the Invention

As described above, according to the present invention, even when the through-hole for circulating a lubricating fluid is formed in the bearing member, the through-hole can be formed by die molding at low cost. Accordingly, cost reduction of the bearing device can be achieved.

Further, the through-hole is formed by die molding. Thus, machined chips are less liable to be generated when compared with the case in which the through-hole is formed by drilling after the bearing member is molded, which is more effective in preventing contamination.

BRIEF DESCRIPTION OF THE DRAWINGS

FIG. 10(a) is a sectional view of a molding die for molding the conventional bearing member 107. FIG. 10(b) is a sectional view taken along the line a-a of the molding die illustrated in FIG. 10(a).

BEST MODE FOR CARRYING OUT THE INVENTION

In the following, a first embodiment of the present invention is described with reference to FIGS. 1 to 4.

Figure 1:
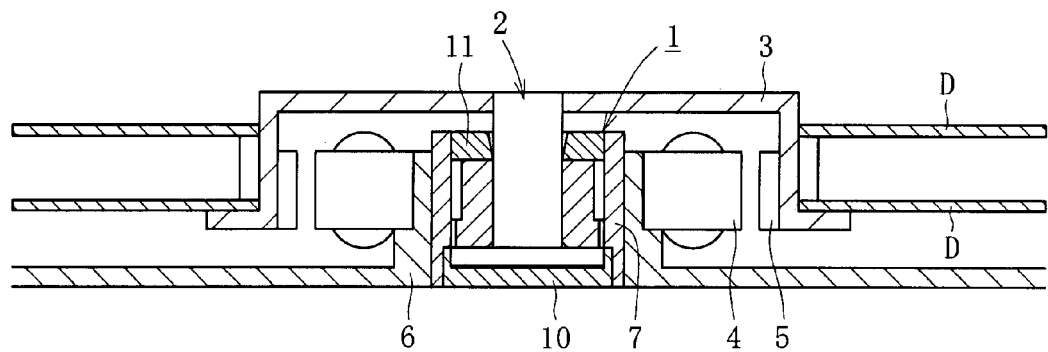
FIG. 1 is a sectional view of a spindle motor in which a fluid dynamic bearing device 1 is incorporated.

FIG. 1 conceptually illustrates a construction example of a spindle motor for an information apparatus incorporating a fluid dynamic bearing device 1 according to a first embodiment of the present invention. The spindle motor is used for a disk drive such as an HDD, and includes the fluid dynamic bearing device 1 for relatively rotating and supporting a shaft member 2 in a non-contact manner, a disk hub 3 fixed to a shaft member 2, a stator coil 4 and a rotor magnet 5 opposed to each other through an intermediation of, for example, a radial gap, and a bracket 6. The stator coil 4 is mounted to the outer periphery of the bracket 6, and the rotor magnet 5 is fixed on an inner periphery of the disk hub 3. A bearing member 7 of the fluid dynamic bearing device 1 is fixed to the inner periphery of the bracket 6. Further, one or multiple (two, in FIG. 2) disks D as information recording media are held on the disk hub 3. In the spindle motor constructed as described above, when the stator coil 4 is energized, the rotor magnet 5 is rotated with an excitation force generated between the stator coil 4 and the rotor magnet 5. In accordance therewith, the disk hub 3 and the disks D held on the disk hub 3 are integrally rotated with the shaft member 2.

Figure 2:
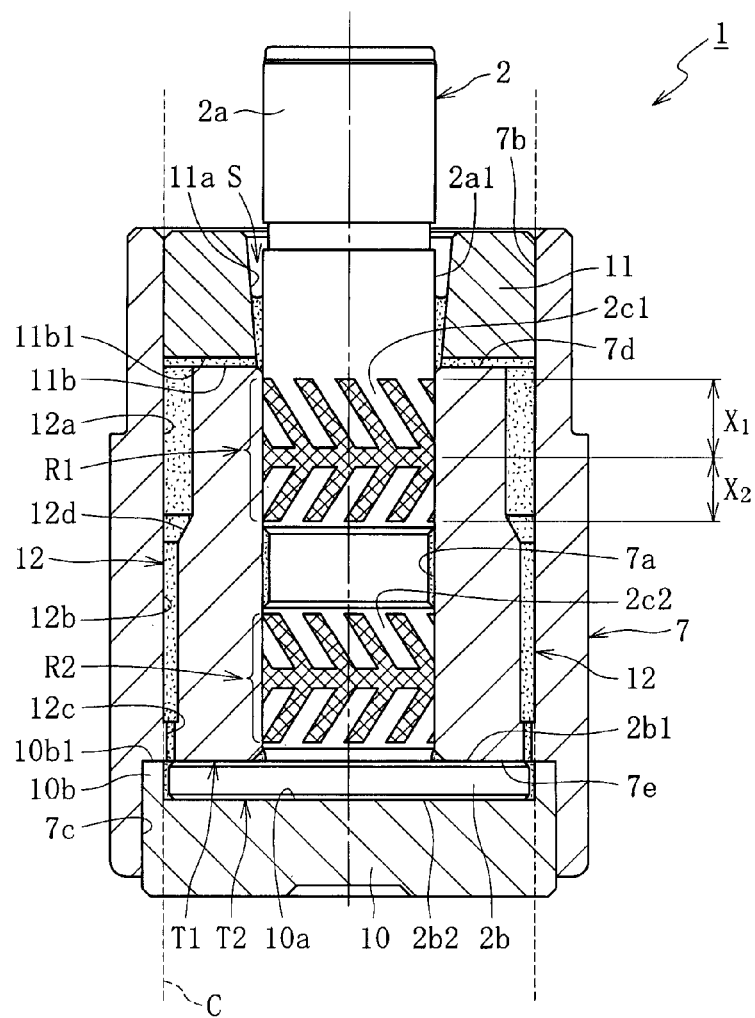
FIG. 2 is a sectional view of the fluid dynamic bearing device 1 according to an embodiment of the present invention.

FIG. 2 illustrates the fluid dynamic bearing device 1. This fluid dynamic bearing device 1 mainly includes the shaft member 7, the shaft member 2 inserted along the inner periphery thereof, a lid member 10 for closing one end of the bearing member 7, and a sealing portion 11 for sealing another end of the bearing member 7. Note that, for the sake of convenience in description, description is made as follows on the assumption that, of the opening portions of the bearing member 7, which are formed at both axial ends, the side which is closed by the lid member 10 is a lower side, and the side opposite to the closed side is an upper side.

The shaft member 2 includes a shaft portion 2*a* and a flange portion 2*b* provided at the lower end of the shaft portion 2*a*. The shaft portion 2*a* is formed in a substantially cylindrical shape with use of a metal material such as SUS steel. The flange portion 2*b* can be formed integrally with the shaft portion 2*a* with use of the same material therefor, or can be formed with use of a separate material. For example, it is possible to adopt hybrid structure in which the flange portion 2*b* is formed of a resin material and integrated with the shaft portion 2*a*.

In the entire or a part of cylindrical surface region of an outer peripheral surface 2*a*1 of the shaft portion 2*a*, there is formed a region where multiple dynamic pressure grooves are arranged as a radial dynamic pressure generating portion. In this embodiment, as illustrated in FIG. 2, for example, regions where multiple dynamic pressure grooves 2*c*1 and 2*c*2 are arranged in a herringbone configuration are formed at two points while being separated in the axial direction. Radial bearing gaps of first and second radial bearing portions R1 and R2 described later are formed, when the shaft member 2 is rotated, between those regions where the dynamic pressure grooves 2*c*1 and 2*c*2 are respectively formed and a smaller diameter inner peripheral surface 7*a* of the bearing member 7 opposed thereto.

The bearing member 7 has a substantially cylindrical shape in which both the ends thereof in the axial direction are opened, and includes the smaller diameter inner peripheral surface 7*a*, a first larger diameter inner peripheral surface 7*b* provided on the upper side of the smaller diameter inner peripheral surface, and a second larger diameter inner peripheral surface 7*c* provided on the lower side of the smaller diameter inner peripheral surface 7*a*. A first shoulder surface 7*d* is formed in a radial direction between the upper end of the smaller diameter inner peripheral surface 7*a* and the lower end of the first larger diameter inner peripheral surface 7*b*, and a second shoulder surface 7*e* is formed in a radial direction between the lower end of the smaller diameter inner peripheral surface 7*a* and the upper end of the second larger diameter inner peripheral surface 7*c*. Note that, in this embodiment, the second larger diameter inner peripheral surface 7*c* has a diameter slightly larger than that of the first larger diameter inner peripheral surface 7*b*.

In this embodiment, the bearing member 7 is formed by injection molding of a resin composition with a base resin formed of a crystalline resin such as liquid crystal polymer (LCP), polyphenylene sulfide (PPS), and polyetherether ketone (PEEK), or of an amorphous resin such as polyphenyl sulfone (PPSU), polyether sulfone (PES), and polyether imide (PEI). Further, there are no particular limitations regarding the type of filler used with the above-mentioned resins. Examples of the filler that can be used include fibrous fillers such as glass fiber, whisker-like fillers such as potassium titanate, scale-like fillers such as mica, and fibrous or powdered conductive fillers such as carbon fiber, carbon black, graphite, carbon nanomaterial, and metal powder. Those fillers may be used singly or in a combination of two or more kinds.

Figure 3:
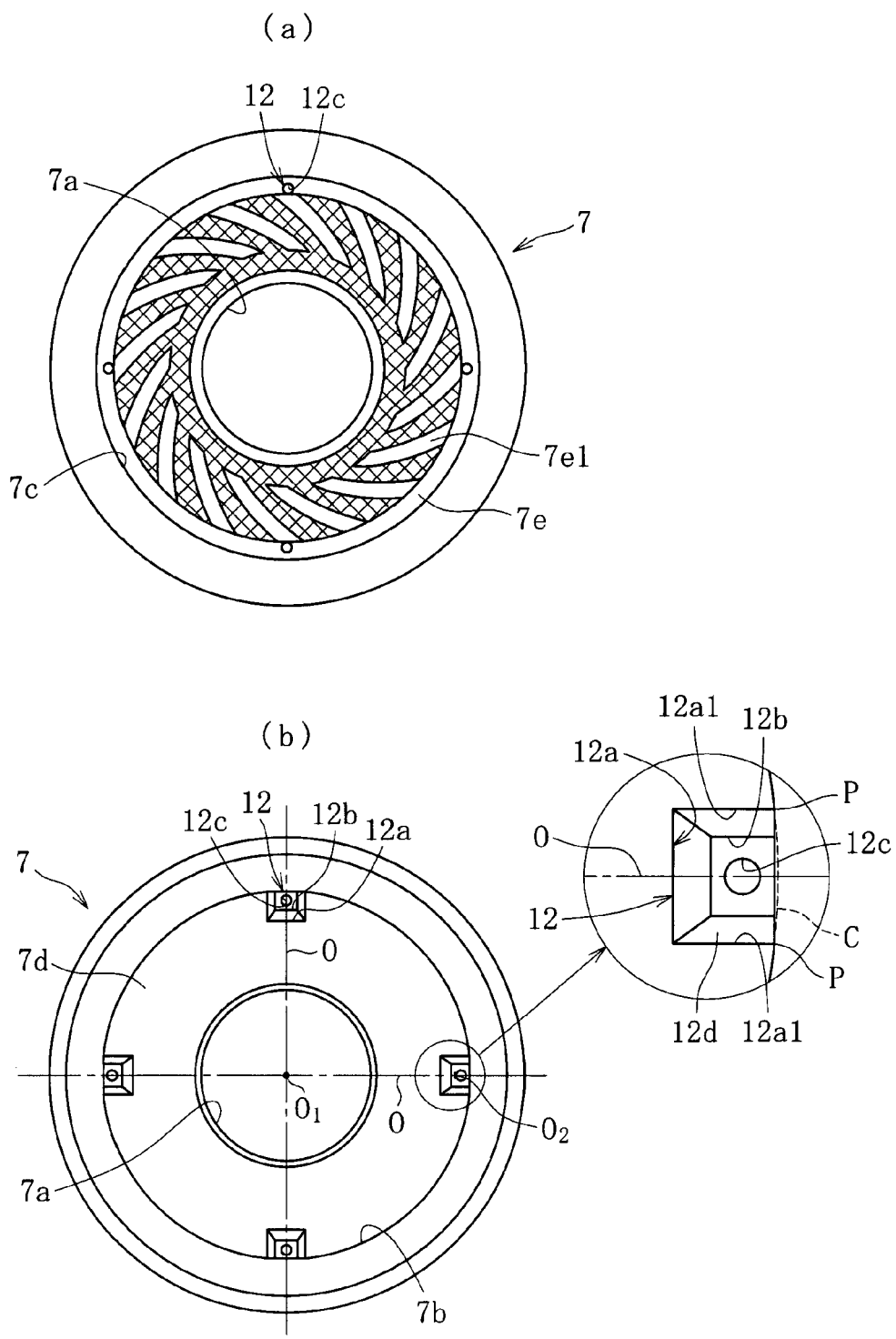
FIG. 3(a) is a bottom view of a bearing member 7.
FIG. 3(b) is a top view of the bearing member 7.

In the entire or a part of annular region of the second shoulder surface 7*e* of the bearing member 7, there is formed a region where multiple dynamic pressure grooves are arranged as a thrust dynamic pressure generating portion. In this embodiment, as illustrated in FIG. 3(*a*), for example, there is formed a region where multiple dynamic pressure grooves 7*e*1 are arranged in a spiral configuration. The region where the dynamic pressure grooves 7*e*1 are formed is opposed to an upper end surface 2*b*1 of the flange portion 2*b*, and forms, together with the upper end surface 2*b*1, thrust bearing gaps of a first thrust bearing portion T1 described later therebetween when the shaft member 2 is rotated (refer to FIG. 2). The dynamic pressure grooves 7*e*1 can be molded simultaneously with injection molding of the bearing member 7 with use of a groove die formed correspondingly thereto in advance in a die used for die molding of the bearing member 7.

As illustrated in FIG. 2, in the bearing member 7, multiple through-holes 12 passing therethrough in the axial direction are formed. In this embodiment, the through-holes 12 is formed so as to have sectional areas which are formed in a direction orthogonal to the axial direction, different from each other in the axial direction, and larger on the upper side, the through-holes 12 being equiangularly provided at four points on the bearing member 7. Specifically, the through-holes 12 are constituted by first flow paths 12*a* having upper ends open to the first shoulder surface 7*d* and the largest sectional areas, third flow paths 12*c* having lower ends open to the second shoulder surface 7*e* and the smallest sectional areas, and second flow paths 12*b* formed between the first flow paths 12*a* and the third flow paths 12*c* and having the sectional areas which are smaller than those of the first flow paths 12*a* and larger than those of the third flow paths 12*c*. The first and second flow paths 12*a* and 12*b* are formed in rectangular cross-sections, and the third flow paths 12*c* are formed in circular cross-sections (refer to FIG. 3(*b*)). Further, in order to make the first flow paths 12*a* and the second flow paths 12*b* smoothly continuous with each other, tapered continuous portions 12*d* are formed therebetween. The second flow paths 12*b* may be omitted so as to constitute the through-holes 12 by the first flow paths 12*a* and the third flow paths 12*c*.

In the through-holes 12, as illustrated in FIG. 3(*b*) in an enlarged manner, the inner peripheral surface of each of the first flow paths 12*a* is brought into contact at two points with the imaginary cylindrical surface C (indicated by a broken line) including the first larger diameter inner peripheral surface 7*b* in a lateral cross-section thereof (contact points are indicated by P). As in this embodiment, when each of the first flow paths 12*a* has a rectangular sectional shape, one sides 12*a*1 and 12*a*1 of the inner peripheral surface of each of the first flow paths 12*a*, which extend respectively from the contact points P toward the central side of the bearing member, are parallel to the center line O of each of the through-holes 12

(straight lines connecting center $O_1$ of bearing member 7 and centers (centroids) $O_2$ of first flow path 12a).

As described above, in this embodiment, the thrust bearing gaps are formed while facing the second shoulder surface 7e of the bearing member 7. In order to prevent dynamic-pressure absence in the thrust bearing gaps, it is desirable that the through-holes 12 be open in the region except the thrust bearing gaps of the second shoulder surface 7e (region where dynamic pressure grooves 7e1 are formed). As described above, when one ends of the through-holes 12 (open end portions of first flow paths 12a) are brought into contact with the imaginary cylindrical surface C, the through-holes 12 can be formed at the radially outer end of the second shoulder surface 7e. Accordingly, it is possible to sufficiently ensure the radial widths of the thrust bearing gaps, to thereby obtain a high supporting force in the thrust direction.

Further, the inner peripheral surfaces on the radially outer side of the first flow paths 12a and the second flow paths 12b are flush with each other in the axial direction. With this configuration, the through-holes 12 can be open further to the radially outer side in the second shoulder surface 7e, and hence the region of the thrust bearing gaps can be expanded in the radially outer direction. As a result, it is possible to further increase the supporting force in the thrust direction. Specifically, as in this embodiment, when the through-holes 12 have sectional areas different from each other in the axial direction, and the third flow paths 12c having the smallest sectional areas are open to the second shoulder surface 7e of the bearing member 7, further expansion of the thrust bearing gaps in the radial direction is effectively achieved. Note that, in this embodiment, the third flow paths 12c extend from the central portions of the lower end portions of the second flow paths 12b. In this context, when the third flow paths 12c are provided on the radially outer side of the bearing member 7, the region of the thrust bearing gaps can be further expanded.

The first flow paths 12a having the largest sectional areas are provided on a side of the through-holes 12, on which it is unnecessary to consider the dynamic-pressure absence (side of sealing portion 11), whereby it is possible to increase an amount of oil retained on the inside of the bearing. As in the present invention, when the bearing member 7 is integrally formed of a resin, the bearing member 7 cannot be impregnated with a lubricating oil, and hence the amount of oil retained on the inside of the bearing device tends to be decreased. However, with the above-mentioned configuration, it is possible to make up for the lack of lubricating oil so as to supply a large amount of lubricating oil to the radial bearing gaps and the thrust bearing gaps.

Further, the upper end opening portions of the through-holes 12 have rectangular shapes having large sectional areas, and the lower end opening portions thereof have circular shapes having small sectional areas. Thus, difference in shape of both the opening portions remarkably emerges, and hence the upper and lower sides of the bearing member 7 can be easily distinguished. Accordingly, it is possible to avoid erroneous assembly.

To the second larger diameter inner peripheral surface 7c of the bearing member 7, a lid member 10 for closing the lower end of the bearing member 7 is fixed by means such as bonding (including loose bonding), press-fitting (including press-fit bonding), adhesion (including ultrasonic adhesion), or welding. In this case, between the fixation surfaces of the bearing member 7 and the lid member 10, it is necessary to secure sealability at least to the extent that a lubricating oil filling the inside of the bearing does not leak out to the outside.

In a part of annular region of an upper end surface 10a of the lid member 10, as a thrust dynamic pressure generating portion, there is formed a region (not shown) where multiple dynamic pressure grooves are arranged in a configuration reverse to the spiral configuration illustrated in FIG. 3(a) in a circumferential direction. The region where the dynamic pressure grooves are formed is opposed to a lower end surface 2b2 of the flange portion 2b, and forms, together with the lower end surface 2b2, thrust bearing gaps of a second thrust bearing portion T2 described later therebetween when the shaft member 2 is rotated (refer to FIG. 2).

Further, on the outer periphery of the upper end surface 10a of the lid member 10, there is formed a protruding portion 10b protruding upward. In a state in which an abutting surface 10b1 positioned at the upper end of the protruding portion 10b are held in abutment with the second shoulder surface 7e of the bearing member 7, the lid member 10 is fixed to the second larger diameter inner peripheral surface 7c of the bearing member 7. In this case, a value obtained by subtracting an axial width of the flange portion 2b from an axial dimension of the protruding portion 10b is equal to the sum of the thrust bearing gaps of the thrust bearing portions T1 and T2.

To the first larger diameter inner peripheral surface 7b of the bearing member 7, an annular sealing portion 11 is fixed while a lower end surface 11b thereof is held in abutment with the first shoulder surface 7d. Between an inner peripheral surface 11a of the sealing portion 11 and the outer peripheral surface 2a1 of the shaft portion 2a, which is opposed thereto, there is formed a tapered seal space S which is obtained by increasing upward the dimensions in the radial direction. When a lubricating oil described later fills the inside of the bearing device, the oil surface of the lubricating oil constantly falls within the range of the seal space S.

In an interior space of the fluid dynamic bearing device 1 configured as described above, a lubricating fluid, for example, a lubricating oil is filled. Examples of the lubricating oil include ones of various types. As a lubricating oil provided to the fluid dynamic bearing device for a disk drive such as an HDD, in consideration of changes in temperature during use and transportation thereof, it is possible to suitably use an ester-based lubricating oil superior in low evaporation rate and low viscosity, for example, a lubricating oil including dioctyl sebacate (DOS) or dioctyl azelate (DOZ) as a base oil.

In the fluid dynamic bearing device 1 configured as described above, when the shaft member 2 is rotated, radial bearing gaps are formed between the regions where the dynamic pressure grooves 2c1 and 2c2 formed in the outer peripheral surface 2a1 of the shaft portion 2a are formed and the smaller diameter inner peripheral surface 7a of the bearing member 7 opposed thereto. Then, in accordance with the rotation of the shaft member 2, the lubricating oil in the radial bearing gaps are pressed to the central side in the axial direction of the dynamic pressure grooves 2c1 and 2c2, and the pressure thereof is increased. As described above, owing to the dynamic pressure effect of the lubricating oil, which is generated by the dynamic pressure grooves 2c1 and 2c2, the first radial bearing portion R1 and the second radial bearing portion R2 for supporting the shaft member 2 in the radial direction in a non-contact manner are constituted, respectively.

Simultaneously, pressures of the lubricating oil films are increased by the dynamic pressure effect of the dynamic pressure grooves, the lubricating oil films being formed in the thrust bearing gaps between the second shoulder surface 7e of the bearing member 7 (region where dynamic pressure grooves 7e1 are formed) and the upper end surface 2b1 of the flange portion 2b, which is opposed thereto, and formed in the thrust bearing gaps between the upper end surface 10a of the lid member 10 (region where dynamic pressure grooves are formed) and the lower end surface 2b2 of the flange portion 2b, which is opposed thereto. Then, the first thrust bearing portion T1 and the second thrust bearing portion T2 for supporting the shaft member 2 in the thrust direction are constituted by the pressures of those oil films.

In this case, with use of fluid paths constituted by the through-holes 12 and multiple radial grooves 11b1 provided in a lower end surface lib of the sealing portion 11, a communicating state is established between the thrust bearing gaps of the thrust bearing portions T1 and T2 and the seal space S provided on the opening side of the bearing member 7 (side of sealing portion 11). With this configuration, it is possible to prevent a phenomenon in which the pressure of the lubricating oil on the inside of the bearing locally becomes negative and to solve the problems such as generation of air bubbles involved in generation of the negative pressure, and leakage of the lubricating oil and occurrence of vibration due to generation of air bubbles.

Further, in this embodiment, dynamic pressure grooves 2c1 of the first radial bearing portion R1 are formed asymmetrically in the axial direction. Specifically, an axial dimension X1 of the dynamic pressure grooves on the upper side with respect to the axial intermediate portion is larger than an axial dimension X2 of the dynamic pressure grooves on the lower side (X1>X2). Therefore (refer to FIG. 2), when the shaft member 2 is rotated, a drawing-in force (pumping force) to the lubricating oil generated by the dynamic pressure grooves 2c1 is relatively larger in the upper region as compared with that in the lower region. In this context, due to differential pressure caused by the drawing-in force, the lubricating oil filled between the smaller diameter inner peripheral surface 7a of the bearing member 7 and the outer peripheral surface 2a1 of the shaft portion 2a flows downwards, and circulates through the path constituted by the thrust bearing gaps of the first thrust bearing portion T1, the through-holes 12, and the radial grooves 11b1 of the sealing portion 11 in the stated order so as to be drawn into the radial bearing gaps of the first radial bearing portion R1 again. In this manner, the lubricating oil in the bearing is forced to flow and circulate, whereby it is possible to enhance the abovementioned effect of preventing negative pressure generation of the lubricating oil. Note that, when it is particularly unnecessary for the lubricating oil to be forced to circulate as described above, the dynamic pressure grooves 2c1 may be symmetric in the axial direction.

Figure 4:
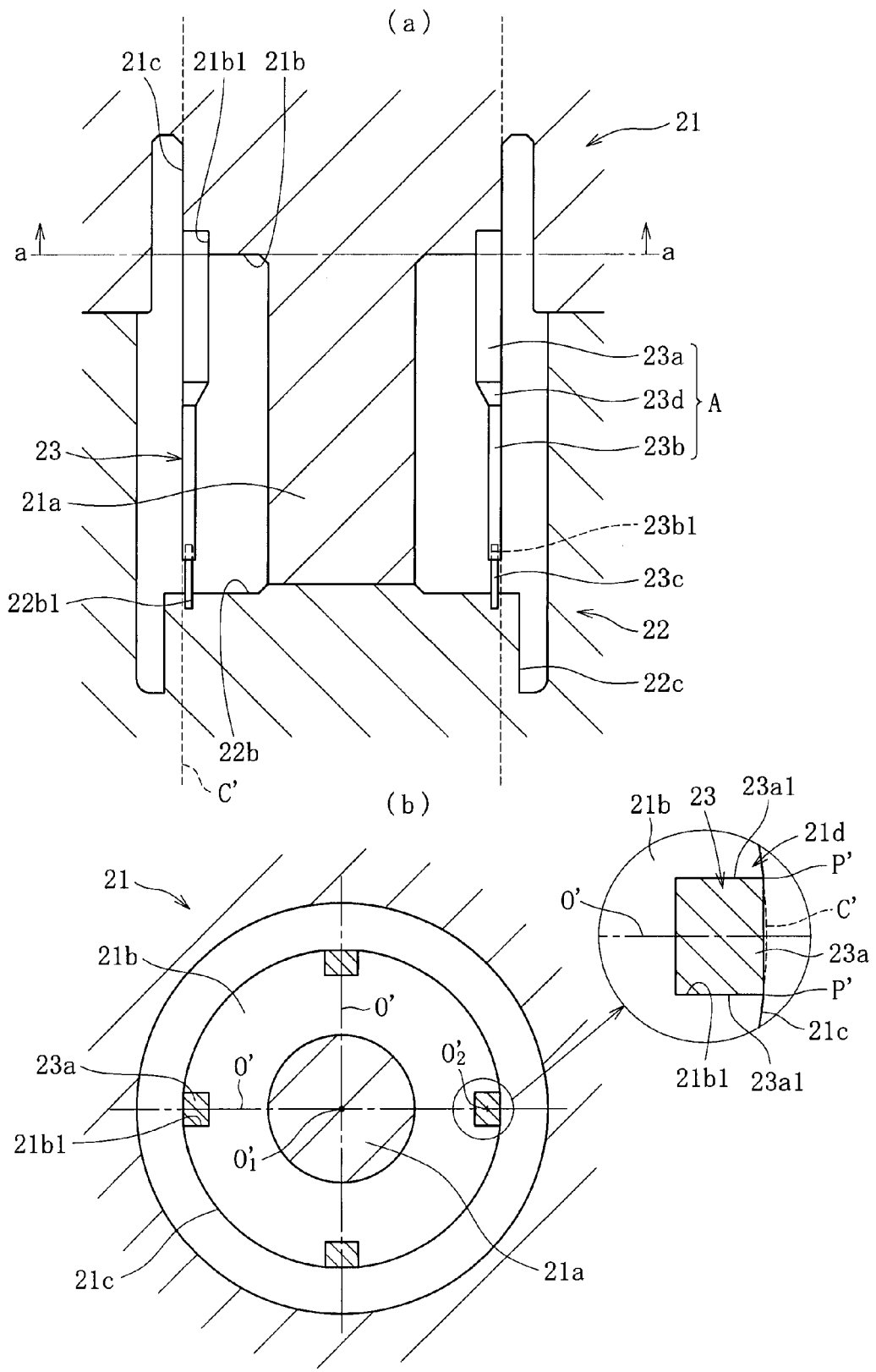
FIG. 4(a) is a sectional view of a molding die for molding the bearing member 7.
FIG. 4(b) is a sectional view taken along the line a-a of the molding die illustrated in FIG. 4(a).

In the following, a molding die for molding the bearing member 7 is described with reference to FIG. 4. The die is constituted by the movable die 21, the fixed die 22, and the molding pins 23 for molding the through-holes 12.

The movable die 21 includes a shaft portion 21a for molding the smaller diameter inner peripheral surface 7a of the bearing member 7, a shoulder surface 21b for molding the first shoulder surface 7d, and a cylindrical surface 21c for molding the first larger diameter inner peripheral surface 7b. The fixed die 22 includes an end surface 22b for molding the second shoulder surface 7e and a cylindrical surface 22c for molding the second larger diameter inner peripheral surface 7c.

The molding pins 23 are formed in shapes corresponding to the shapes of the through-holes 12, and are arranged at predetermined positions in the cavity formed of the movable die 21 and the fixed die 22. In this embodiment, the molding pins 23 include prismatic first molding pins 23a for molding the first flow paths 12a of the through-holes 12, prismatic second molding pins 23b for molding the second flow paths 12b, columnar third molding pins 23c for molding the third flow paths 12c, and intermediate portions 23d for molding the continuous portions 12d. The first molding pins 23a, the second molding pins 23b, and the intermediate portions 23d are formed integrally with each other, and integrated products thus obtained are referred to as large diameter pins A. The large diameter pins A are fixed to the fixation holes 21b1 provided on the radially outer side of the shoulder surface 21b of the movable die 21, and the third molding pins 23c are fixed to fixation holes 22b1 provided on the radially outer side of the end surface 22b of the fixed die 22. When the movable die 21 and the fixed die 22 are clamped to each other, the upper end portions of the third molding pins 23c are fitted to fitting holes 23b1 provided in the central portions of the lower end surfaces of the second molding pins 23b. As a result, the large diameter pins A and the third molding pins 23c are positioned in the die (refer to FIG. 4(a)).

As described above, when the molding pins 23 are divided into two (large diameter pins A and third molding pins 23c) so that ones are fixed to the movable die 21 and the others are fixed to the fixed die 2, and that both the pins are fitted to each other in the cavity at the time of clamping, the lengths of the pins protruding from the die on the one side can be reduced. As a result, it is possible to increase the rigidity of the pins, which is effective in preventing the molding pins from being broken owing to injection pressure or the like. In particular, as in this embodiment, when the pins on one side have larger diameters as those of the pins on the other side, the pins A on the larger diameter side is elongated with respect to the pins 23c on the smaller diameter side, which is more effective in preventing the molding pins from being broken.

In the present invention, as illustrated in FIG. 4(b), the outer peripheral surfaces of the first molding pins 23a of the molding pins 23, which are retained in the movable die 21, are formed in sectional shapes of being held in contact at two points with an imaginary cylindrical surface C' including a contour of the cylindrical surface 21c for molding the first larger diameter inner peripheral surface 7b of the bearing member 7. In particular, as in this embodiment, when the upper end side of the molding pins 23 is formed in a rectangular cross-section, outer peripheral surfaces 23a1 of the first molding pins 23a, which extend from contact points P' between the imaginary cylindrical surface C' and the outer peripheral surfaces of the first molding pins 23a to the axial center, are parallel to center lines O' of the first molding pins 23a (straight lines connecting axial center $O_1$' and centers $O_2$' of first molding pins 23a). Accordingly, undercuts of the fixation holes 21b1 into which the first molding pins 23a are inserted are not generated, and hence it becomes easier to process the fixation holes 21b1. Further, it is possible to cause the corner portions 21d between the fixation holes 21b1 and the cylindrical surface 21c to be obtuse, thereby making it possible to prevent deformation and breakage of the corner portions 21d. Accordingly, significant increase in manufacturing cost of the die can be prevented, with the result that cost reduction of the bearing device can be achieved.

As in this embodiment, when the first flow paths 12a and the second flow paths 12b are formed in rectangular shapes and the surfaces on the radially outer side thereof are flush with each other, the molding surfaces corresponding to the first molding pins 23a and the second molding pins 23b are formed to be stepless flat surfaces. Accordingly, both the surfaces can be finished with high accuracy. In contrast, when the first flow paths and the second flow paths are formed in circular shapes and the radially outer end portions thereof are aligned with each other, the molding pins are formed in two columnar shapes having diameters different from each other, and are formed in accurate shapes in which the radially outer end portions are aligned in a single straight line in the axial direction. Thus, it becomes difficult to process the molding pins 23, which leads to significant increase in manufacturing cost of the molding pins 23.

Further, the third molding pins 23c for molding the third flow paths 12c have extremely thin shapes, and hence are formed in columnar shapes which facilitate the processing thereof. Thus, each of the fitting holes 23b1 of the second molding pins 23b, to which the third molding pins 23c are fitted, is formed in a shape of a cylindrical surface. In order to prevent the cylindrical fitting holes 23b1 from forming undercuts of the second molding pins 23b, the fitting holes 23b1 are provided in substantially the central portions of the lower end surfaces of the second molding pins 23b. Note that, when the third molding pins 23c are formed, for example, in rectangular sectional shapes, the fitting holes 23b1 do not form undercuts of the second molding pins 23b, and hence the fitting holes 23b1 can be provided in the lower end surfaces of the second molding pins 23b on the relatively radially outer side of the bearing. With this configuration, the third flow paths 12c can be provided on the relatively radially outer side of the bearing, and hence the region where the thrust bearing gaps of the first thrust bearing portion T1 are formed can be expanded.

Figure 5:
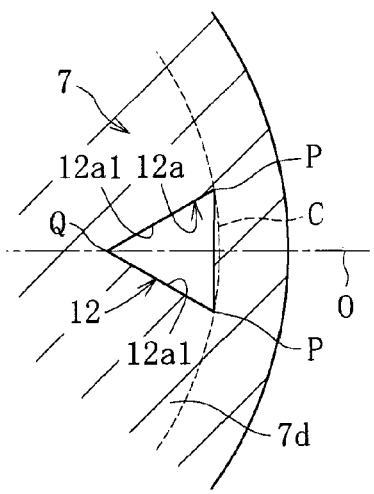
FIG. 5 is a sectional view illustrating another example of a through-hole 12.

The present invention is not limited to the above-mentioned embodiment. In the above-mentioned embodiment, while the first flow paths 12a of the through-holes 12 are formed in rectangular cross-sections, a mode thereof is not particularly limited as long as each of the inner peripheral surfaces (contour lines) of the through-holes 12 are held in contact at the two points P with the imaginary cylindrical surface C. Other examples of the through-holes 12 are described with reference to FIGS. 5 to 7 which are sectional views of the first flow paths 12a of the bearing member 7.

Figure 6:
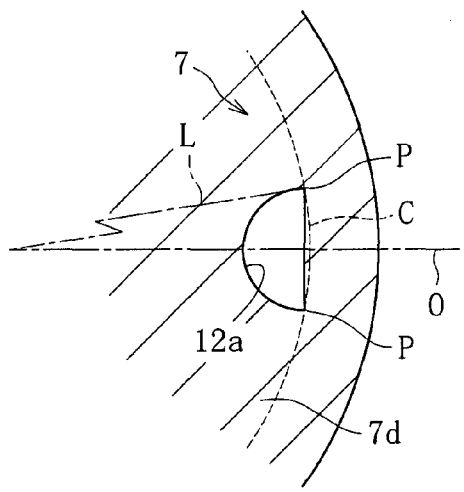
FIG. 6 is a sectional view illustrating another example of the through-hole 12.
Figure 7:
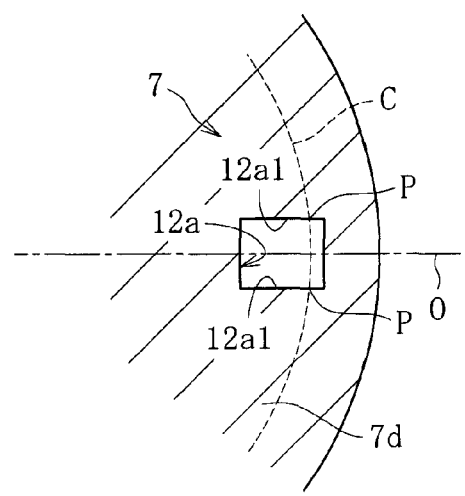
FIG. 7 is a sectional view illustrating another example of the through-hole 12.

Examples of each of the sectional shapes of the inner peripheral surfaces of the through-holes 12 may include a triangular shape (refer to FIG. 5) or a semicircular shape (refer to FIG. 6). In those cases, both the one sides 12a1 of the inner peripheral surface of the through-hole 12 (refer to FIG. 5) and the tangent lines L at the contact points P on the inner peripheral surface of the through-hole 12 (refer to FIG. 6) gradually approach the center line O of the through-hole 12 toward the central side of the bearing member, the one sides extending from the contact points P toward the central side of the bearing member, the tangent lines extending from the contact points P toward the central side of the bearing member. With this configuration, the same effects as those in the above-mentioned embodiment can be obtained. Further, in the configuration as illustrated in FIG. 6, even when the tangent lines L at the contact points P are parallel to the center line O of the through-hole 12, the same effects as those described above can be obtained (not shown). Alternatively, in the example illustrated in FIG. 7, the through-hole 12 protrudes on the radially outer side with respect to the imaginary cylindrical surface C. Also in this configuration, the one sides 12a1 of the inner peripheral surface of the through-hole 12, which extend from the contact points P toward the central side of the bearing member, are parallel to the center line O of the through-hole 12, and hence the same effects as those described above can be obtained.

Figure 8:
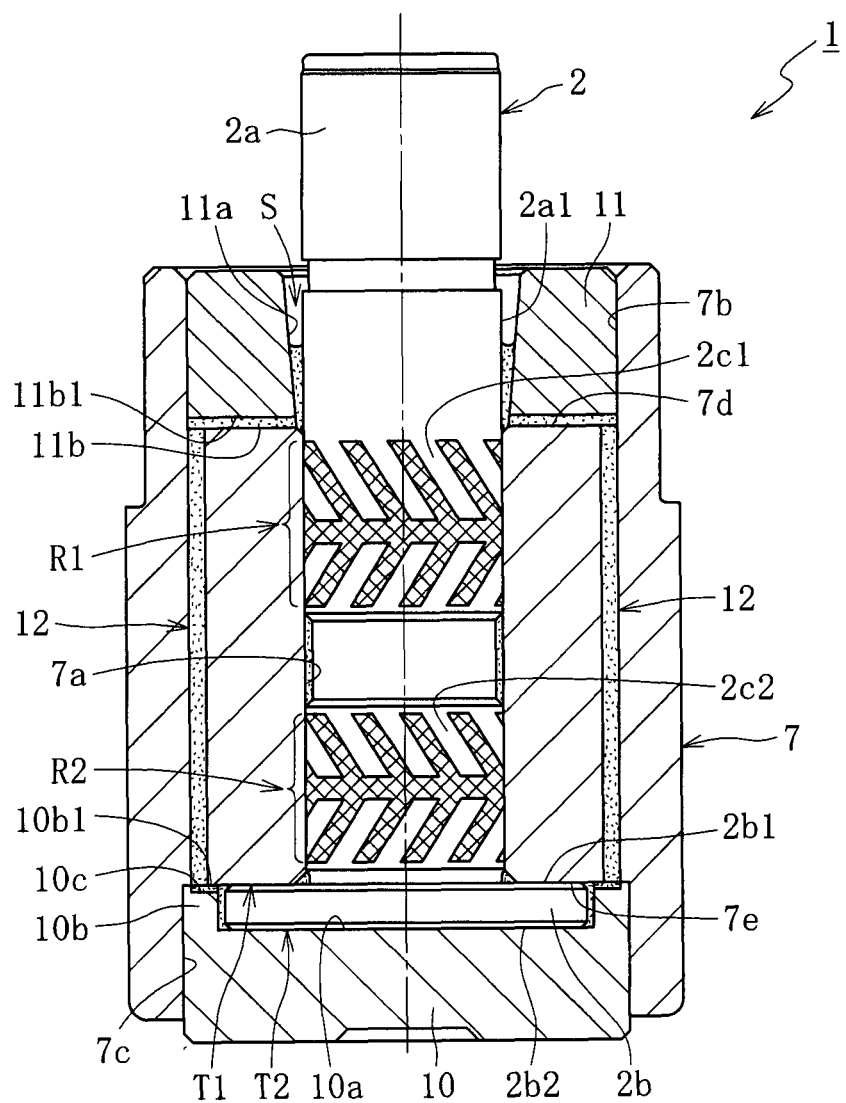
FIG. 8 is a sectional view of the fluid dynamic bearing device 1 according to another embodiment of the present invention.
Figure 9:
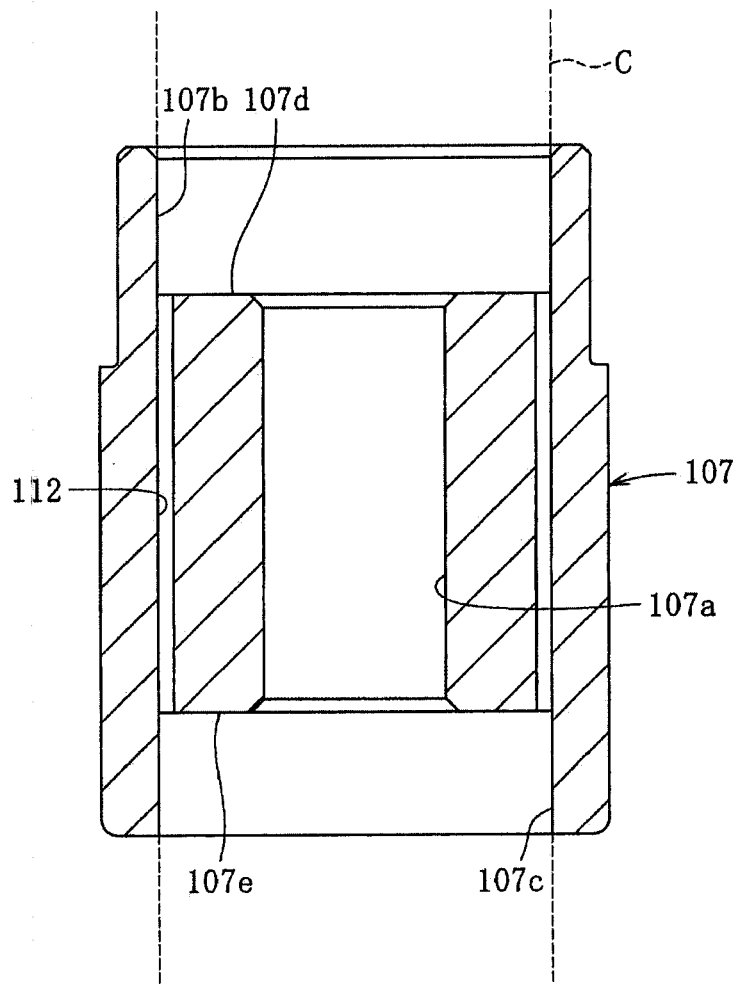
FIG. 9 is a sectional view of a conventional bearing member 107.

Further, in the above-mentioned embodiment, there is illustrated a case where the through-holes 12 have sectional areas different from each other in the axial direction. However, as illustrated in FIG. 8, for example, it is also possible to provide through-holes 12 which have uniform sectional shapes in the axial direction (rectangular shapes, for example, which are not shown). In this embodiment, lower end opening portions of the through-holes are communicated with the thrust bearing gaps through an intermediation of a radial groove 10c provided to the lid member 10.

in this case, the second larger diameter inner peripheral surface 7c of the bearing member 7 has a diameter slightly larger than that of the first larger diameter inner peripheral surface 7b, and hence the lower end opening portions of the through-holes 12 can be separated to the radially inner side from the second larger diameter inner peripheral surface 7c. Accordingly, fixation holes (corresponding to fixation holes 22b1 of fixed die 22 of FIG. 4(a)) into which lower end portions of the molding pins for molding the through-holes 12 are inserted do not form undercuts of the fixed die. Further, when the radially inner dimension of the second larger diameter inner peripheral surface 7c is the same as that of the first larger diameter inner peripheral surface 7b, the fixation holes into which the lower end portions of the molding pins are inserted have the same configuration as those of fixation holes into which the upper end portions thereof are inserted (corresponding to fixation holes 21b1 of movable die 21 of FIG. 4(a)). Therefore, undercuts or acute corner portions are not formed on the fixed die.

Further, in the above-mentioned embodiments, the bearing member 7 is formed by injection molding of a resin. However the present invention is not limited thereto. For example, the bearing member 7 may be formed by injection molding of metal powder (so-called metal injection molding).

Further, in the above-mentioned embodiments, the structure is illustrated in which the dynamic pressure grooves of a herringbone configuration or a spiral configuration constitute the radial bearing portions R1 and R2 and the thrust bearing portions T1 and T2 so as to generate the dynamic pressure effect of the lubricating oil. However, the present invention is not limited thereto.

For example, as the radial bearing portions R1 and R2, there may be adopted a so-called step bearing in which axial grooves (not shown) are formed at multiple portions in a circumferential direction, or a multi-arc bearing in which multiple arc surfaces are arranged in the circumferential direction so as to form, together with the small diameter inner peripheral surface 7a of the bearing member 7 opposed thereto, a wedge-like radial gap (bearing gap) therebetween.

Further, while not shown as well, one or both the first thrust bearing portion T1 and the second thrust bearing portion T2 are constituted by a so-called step bearing or a wave bearing (in which the wave shape is substituted for the step configuration), in which multiple dynamic pressure grooves of a radial groove configuration are provided at predetermined intervals in a circumferential direction.

Further, in the above-mentioned embodiment, there is illustrated the case where the dynamic pressure generating portions are formed in the outer peripheral surface 2a1 of the shaft member 2 and the second shoulder surface 7e of the bearing member 7, and in the upper end surface 10a of the lid member 10. However, the dynamic pressure generating portions may be formed, for example, in the smaller diameter inner peripheral surface 7a of the bearing member 7, and in the upper end surface 2b1 and the lower end surface 2b2 of the flange portion 2b, which are opposed thereto through an intermediation of the bearing gaps.

Further, in the above-mentioned embodiments, the radial bearing portions R1 and R2 are provided separately from each other in the axial direction. However, the present invention is not limited thereto. For example, those may be formed continuously with each other, or only any one of the radial bearing portions R1 and R2 may be provided.

Further, in the above description, the lubricating oil is illustrated as a fluid filled inside the fluid dynamic bearing device 1 so as to generate the dynamic pressure effect in the radial bearing gap and the thrust bearing gap. Otherwise, it is possible to use a fluid capable of generating dynamic pressure effect in the bearing gaps, such as gas including air, a magnetic fluid, or a lubricating grease.

The fluid dynamic bearing device of the present invention is not limited as described above to a disk drive such as an HDD. The fluid dynamic bearing device of the present invention is also suitably applicable to the support of the rotary shaft of a spindle motor for driving a magneto-optical disk of an optical disk, a small motor for an information apparatus used under high speed rotating condition, a polygon scanner motor in a laser beam printer, or a fan motor used in an electrical apparatus or the like.

The invention claimed is:

1. A fluid dynamic bearing device, comprising:
   a bearing member having:
      a larger diameter inner peripheral surface;
      a smaller diameter inner peripheral surface; and
      a shoulder surface between the larger diameter inner peripheral surface and the smaller diameter inner peripheral surface; and
   an axial through-hole in which a lubricating fluid communicates, the bearing member being integrally formed by die molding together with the through-hole; and
   a shaft member inserted into an inner periphery of the bearing member, the shaft member being supported in a radial direction by means of a dynamic pressure effect of the lubricating fluid, which is generated in a radial bearing gap between the smaller diameter inner peripheral surface of the bearing member and an outer peripheral surface of the shaft member,
   wherein an opening on at least one end side of the axial through-hole is provided at a radially outer end of the shoulder surface,
   wherein the axial through-hole comprising:
      a first flow path having an upper end open to the shoulder surface; and
      a second flow path having a smaller sectional area than the first flow path.
   wherein the first flow path and the second flow path are formed in rectangular cross-sections,
   and wherein inner peripheral surfaces on radially outer sides of the first flow path and the second flow path are flush with each other.

2. A method of manufacturing a bearing member, in which a bearing member comprising the following is integrally formed by injection molding:
   a larger diameter inner peripheral surface;
   a smaller diameter inner peripheral surface forming, together with a shaft member, a radial bearing gap therebetween;
   a shoulder surface between the larger diameter inner peripheral surface and the smaller diameter inner peripheral surface; and
   an axial through-hole in which a lubricating fluid communicates,
   the method comprises arranging a molding pin for molding the through-hole in a cavity,
   wherein a fixation hole which the molding pin is inserted into is provided at a radially outer end of a molding surface of the shoulder surface,
   and wherein the molding pin comprising:
      a first molding pin fixed to the fixation hole; and
      a second molding pin having a smaller sectional area than the first molding pin,
   wherein the first molding pin and the second molding pin are formed in prismatic shape,
   and wherein outer peripheral surfaces on radially outer sides of the first molding pin and the second molding pin are flush with each other.

* * * * *